US008780741B2

(12) United States Patent
Doganata et al.

(10) Patent No.: US 8,780,741 B2
(45) Date of Patent: Jul. 15, 2014

(54) ON-DEMAND INFORMATION RETRIEVAL USING WIRELESS COMMUNICATION DEVICES

(75) Inventors: Yurdaer N. Doganata, Chestnut Ridge, NY (US); Asser N. Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/819,803

(22) Filed: Jun. 21, 2010

(65) Prior Publication Data

US 2011/0310793 A1  Dec. 22, 2011

(51) Int. Cl.
*H04L 12/28* (2006.01)
*H04M 3/493* (2006.01)
*G06F 15/16* (2006.01)

(52) U.S. Cl.
USPC ........... 370/252; 455/414.2; 705/53; 709/206

(58) Field of Classification Search
None
See application file for complete search history.

(56) References Cited

U.S. PATENT DOCUMENTS

| | | | | |
|---|---|---|---|---|
| 6,490,432 B1 * | 12/2002 | Wegener et al. | ............. | 455/3.05 |
| 6,567,660 B1 * | 5/2003 | Wegener | ........................ | 455/418 |
| 6,965,579 B1 * | 11/2005 | Shin | ............................... | 370/312 |
| 7,415,439 B2 * | 8/2008 | Kontio et al. | .................... | 705/53 |
| 7,581,166 B2 | 8/2009 | Renger et al. | | |
| 7,617,246 B2 | 11/2009 | Koch et al. | | |
| 7,773,977 B2 * | 8/2010 | Tominaga | ..................... | 455/416 |
| 7,778,882 B2 * | 8/2010 | Chatter et al. | ............... | 705/26.3 |
| 7,860,019 B2 * | 12/2010 | Zhang et al. | .................. | 370/252 |
| 7,973,665 B2 * | 7/2011 | Desrosiers | ................. | 340/573.1 |
| 8,041,643 B2 * | 10/2011 | Mukerji et al. | ................. | 705/59 |
| 8,073,978 B2 * | 12/2011 | Sengupta et al. | ............ | 709/249 |
| 8,150,617 B2 * | 4/2012 | Manber et al. | ................ | 701/426 |
| 8,346,605 B2 * | 1/2013 | Krikorian et al. | .......... | 705/14.49 |
| 8,560,951 B1 * | 10/2013 | Snyder et al. | ................. | 715/723 |
| 8,613,037 B2 * | 12/2013 | Casey | .......................... | 725/142 |
| 2003/0210806 A1 * | 11/2003 | YoichiShintani et al. | ..... | 382/104 |
| 2003/0212567 A1 * | 11/2003 | Shintani et al. | .................... | 705/1 |
| 2006/0217990 A1 | 9/2006 | Theimer et al. | | |
| 2007/0011704 A1 * | 1/2007 | Anglin | ............................ | 725/46 |
| 2007/0196806 A1 * | 8/2007 | Ljungman et al. | ............ | 434/350 |
| 2008/0163318 A1 | 7/2008 | Chen et al. | | |

(Continued)

OTHER PUBLICATIONS

Jensen, Christian S., et al., "Multidimensional Data Modeling for Location-Based Services," The VLDB Journal, vol. 13, No. 1, pp. 1021, Jan. 2004.

(Continued)

*Primary Examiner* — Gregory Sefcheck
(74) *Attorney, Agent, or Firm* — Thomas Grzesik; Fleit Gibbons Gutman Bongini & Bianco PL

(57) ABSTRACT

A method, information processing system, and computer program product provide on-demand information captured from wireless devices. An information request is received from an electronic device. At least one wireless communication device is identified from a set of wireless communication devices that is available to satisfy the information request. The information request is sent to the at least one wireless communication device in response to identifying the at least one wireless communication device. A set of information is received from the at least one wireless communication device that satisfies the information request. The set of information that has been received is sent to the electronic device. The information request comprises a request for a set of information of at least one information type and from a given geographical location.

20 Claims, 10 Drawing Sheets

(56) References Cited

U.S. PATENT DOCUMENTS

| | | |
|---|---|---|
| 2008/0195641 A1 | 8/2008 | Tischer et al. |
| 2008/0262883 A1* | 10/2008 | Weiss et al. ............... 705/7 |
| 2008/0318597 A1 | 12/2008 | Berns et al. |
| 2009/0023446 A1* | 1/2009 | Das ............... 455/435.2 |
| 2009/0042508 A1* | 2/2009 | Wakasa et al. ............... 455/3.06 |
| 2009/0187486 A1* | 7/2009 | Lefenfeld et al. ............... 705/14 |
| 2009/0234635 A1* | 9/2009 | Bhatt et al. ............... 704/2 |
| 2010/0305844 A1* | 12/2010 | Choi et al. ............... 701/201 |
| 2011/0265116 A1* | 10/2011 | Stern et al. ............... 725/35 |

OTHER PUBLICATIONS

Demestichas, K., et al., "Towards Ambient Community Services," 11$^{th}$ IEEE Syposium on Distributed Simulation and Real-Time Applications, 1550-6525/07, copyright 2007 IEEE, DOI 10.1109/DS-RT.2007.24.

\* cited by examiner

| DEVICE ID | DEVICE TYPE | DEVICE LOCATION | DEVICE CAPABILITIES | USER RATING | PRICING INFORMATION |
|---|---|---|---|---|---|
| DEVICE_1 | CELLULAR PHONE | NEW YORK, 41°12'58.2948" -73°48'21.6072" 74.6 FT. | AUDIO, VIDEO, GPS... | 4.5/5 | AUDIO--$0.50 VIDEO--$0.75 |
| DEVICE_2 | SMART PHONE | LONDON | AUDIO, VIDEO, GPS, TEMPERATURE | 2.5/5 | AUDIO--$0.30 VIDEO--$0.60 TEMP--$0.15 |
| ... | | | | | |
| ... | | | | | |
| DEVICE_N | NOTEBOOK | LOS ANGELES, 34°4'8.238" -118°20'57.5412" 98.9 FT. | AUDIO, VIDEO, SEISMIC... | 5/5 | AUDIO--$0.50 VIDEO--$0.75 SEISMIC--$1.50 |

ON-DEMAND INFORMATION RETRIEVAL USING WIRELESS COMMUNICATION DEVICES

FIELD OF THE INVENTION

The present invention generally relates to information retrieval, and more particularly relates to managing and providing information captured from wireless communication devices.

BACKGROUND OF THE INVENTION

As the Internet and network computing has grown, information has become obtainable from geographically dispersed locations. However, one of the problems of gathering information such as audio, visual, or sensory information from geographically dispersed locations is that the information gathered is limited by the number of sensors deployed.

SUMMARY OF THE INVENTION

In one embodiment a method for providing on-demand information captured from wireless devices is disclosed. The method comprises receiving an information request from an electronic device. At least one wireless communication device is identified from a set of wireless communication devices that is available to satisfy the information request. The information request is sent to the at least one wireless communication device in response to identifying the at least one wireless communication device. A set of information is received from the at least one wireless communication device that satisfies the information request. The set of information that has been received is sent to the electronic device. The information request comprises a request for a set of information of at least one information type and from a given geographical location.

In another embodiment, an information processing system for providing on-demand information captured from wireless devices is disclosed. The information processing system comprises a memory and a processor that is communicatively coupled to the memory. The information processing system also comprises a request handler that is communicatively coupled to the memory and the processor. The request handler is configured to perform a method comprising receiving an information request from an electronic device. At least one wireless communication device is identified from a set of wireless communication devices that is available to satisfy the information request. The information request is sent to the at least one wireless communication device in response to identifying the at least one wireless communication device. A set of information is received from the at least one wireless communication device that satisfies the information request. The set of information that has been received is sent to the electronic device. The information request comprises a request for a set of information of at least one information type and from a given geographical location.

In yet another embodiment a computer program product for providing on-demand information captured from wireless devices is disclosed. The computer program product comprises a storage medium readable by a processing circuit and storing instructions for execution by the processing circuit for performing a method. The method comprises receiving an information request from an electronic device. At least one wireless communication device is identified from a set of wireless communication devices that is available to satisfy the information request. The information request is sent to the at least one wireless communication device in response to identifying the at least one wireless communication device. A set of information is received from the at least one wireless communication device that satisfies the information request. The set of information that has been received is sent to the electronic device. The information request comprises a request for a set of information of at least one information type and from a given geographical location.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 illustrates one example of a database record for an information providing wireless device according to one embodiment of the present invention;

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

The term "wireless device" is intended to broadly cover many different types of devices that can wirelessly receive signals, and optionally can wirelessly transmit signals, and may also operate in a wireless communication system. For example, and not for any limitation, a wireless communication device can include (but is not limited to) any one or a combination of the following: a cordless phone, a two-way radio, a cellular telephone, a mobile phone, a smartphone, a two-way pager, a wireless messaging device, a laptop/computer, automotive gateway, or a residential gateway.

Operating Environment

Figure 1:
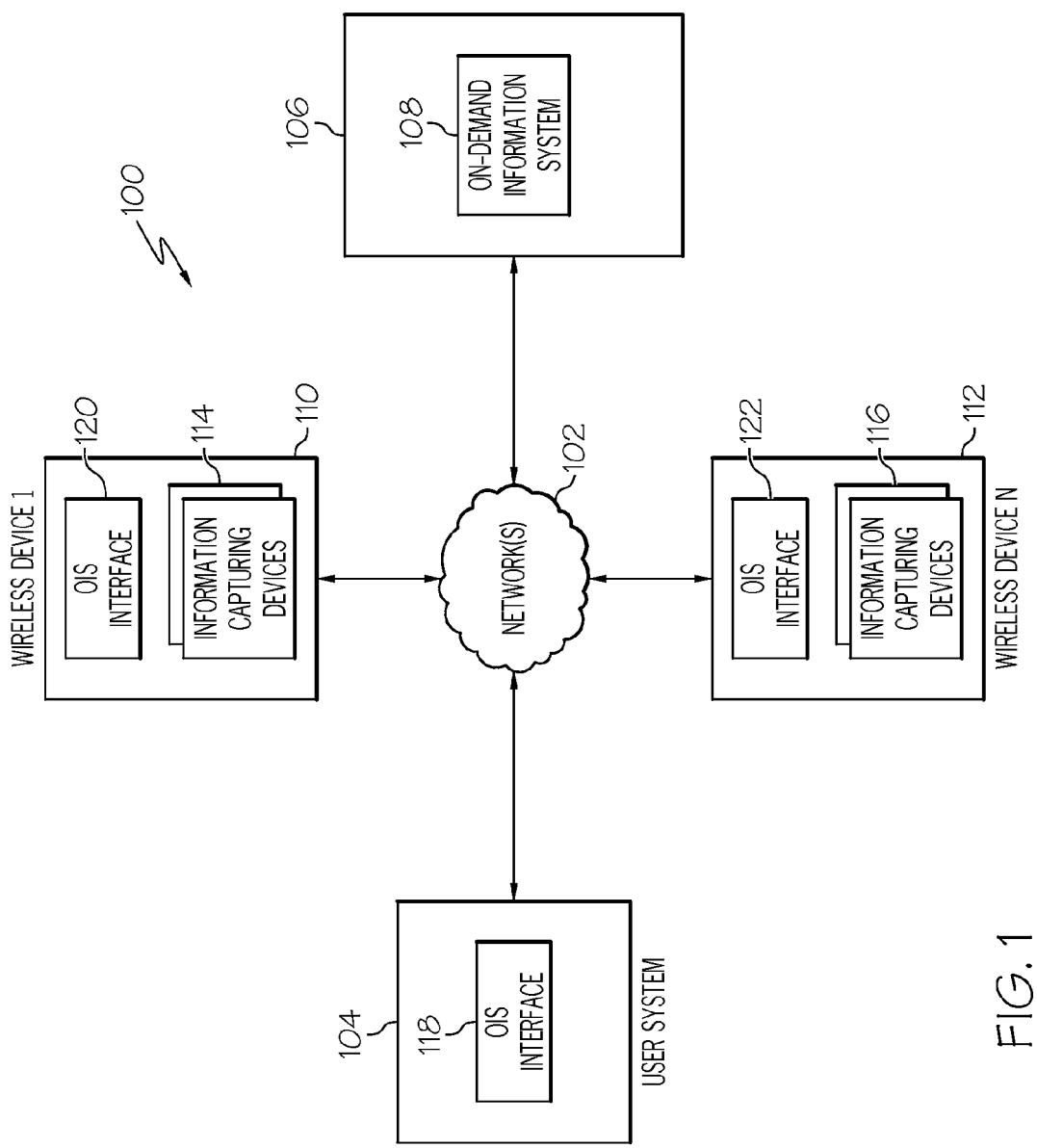
FIG. 1 is a block diagram illustrating one example of an operating environment according to one embodiment of the present invention.

According to one embodiment, FIG. 1 illustrates one example of an operating environment/system 100 for requesting, aggregating, and providing information such as audio, video, and sensory information from geographically dispersed wireless devices on demand. FIG. 1 shows one or more networks 102 that, in one embodiment, are wide area networks, local area networks, wired networks, wireless networks, and/or the like. The one or more networks 102, in one embodiment, also comprise wireless communication networks.

These wireless communication networks can comprise wireless communication standards such as, but not limited to, Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMAX, or the like. The wireless communications networks are able to be an IP or SIP based connectivity network, which provides data connections at much higher transfer rates than a traditional circuit services network. These networks are able to comprise an Evolution Data Only ("EV-DO") network, a General Packet Radio Service ("GPRS") network, a Universal Mobile Telecommunications System ("UMTS") network, an 802.11 network, an 802.16 (WiMAX) network, Ethernet connectivity, dial-up modem connectivity, or the like. It should be noted that these network technologies are only used as an illustrative example and do not limit further embodiments of the present invention.

FIG. 1 also shows one or more user systems (information requesting devices) 104 that are communicatively coupled to the network 102. The user system(s) 104, in one embodiment, is an information processing system, such as a desktop, notebook, or the like, a wireless device, or the like. One or more server systems 106 are also communicatively coupled to the network 102. The one or more server systems 106 comprise an on-demand information system (OIS) 108. The OIS 108, in one embodiment, provides on-demand information such as obtained from one or more wireless devices (information providers) 110, 112 communicatively coupled to the network 102 to the user system 104. The user systems 104 interact with the OIS 108, in one embodiment, by sending an information request to the system 108, negotiating a transaction price for the information, rating an information provider 110, 112, and the like. In one embodiment, the wireless devices 110, 112 are wireless communication devices such as a cellular phone, smart phone, or the like. Each of the wireless devices 110, 112 comprises one or more information capturing devices 114, 116, such as a camera, a camcorder, a microphone, global positioning satellite systems, various sensors (e.g., accelerometers, temperature gauges, pressure gauges, altimeters, etc.), and the like.

A user via an OIS interface 118, which can be an application, web browser, or the like, interacts with the OIS 108 at the server system 106 to request an information set. The OIS 108 communicates with one or more of the wireless devices 110, 112, via OIS interfaces 120, 122 residing on the devices 110, 112 to obtain the information requested by the user. In one embodiment, the wireless devices 110, 112 can be geographically dispersed around the world. The wireless devices 110, 112 use their information capturing devices 114, 116 to capture the requested information. This captured information is then transmitted to the OIS 108. The OIS 108 then sends this information to the user system 104 either through the OIS interface 118, email, text/MMS message, instant message, or the like. The OIS system 108 is discussed in greater detail below.

On-Demand Information Utilizing Wireless Devices

Figure 2:
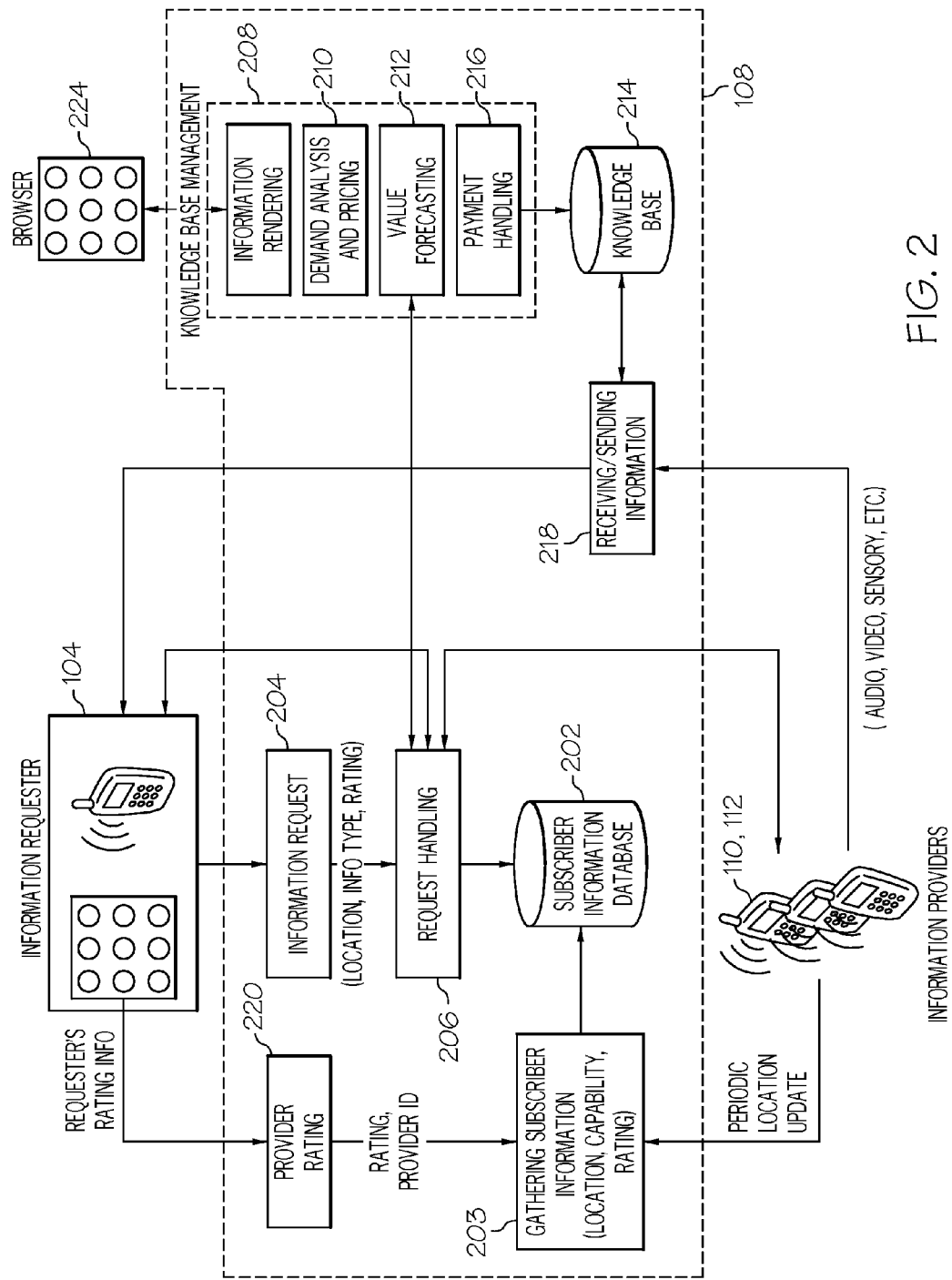
FIG. 2 is a detailed view of an on-demand information system according to one embodiment of the present invention.

The OIS 108, in one embodiment, utilizes wireless devices 110, 112 that can reside at geographically dispersed locations around the world to collect audio, visual, and other sensor information on demand from a selected geographic location. FIG. 2 shows a more detailed view of the OIS 108 within the operating environment 100. In particular, the OIS 108 comprises a database 202 of wireless devices 110, 112 that have registered with the OIS 108 to act as information providers. The OIS 108 maintains various information sets associated with each registered information provider 110, 112 such as wireless device type, wireless device capabilities, wireless device location, pricing information, and the like. In one embodiment, an information provider managing component 203 actively manages the information providers 110, 112. For example, the information provider manager 203 can dynamically update provider information within the database 202 with location information as the provider 110, 112 changes its location.

FIG. 3 shows one example of a database record 300 for maintaining this information. It should be noted that the columns/entries shown in FIG. 3 are only example and one or more columns/entries can be added/deleted. In particular, FIG. 3 shows a database record 300 comprising a "Device_ID" column 302, a "Device Type" column 304, a "Device Location" column 306, a "Device Capabilities" column 308, a "User Rating" column 310, and a "Pricing Information" column 312. Entries 314 under the "Device ID" column 302 comprise device identifiers that uniquely identify each registered wireless device 110, 112. Entries 316 under the "Device Type" column 304 indicate a device type associated with each of the registered wireless devices 110, 112. For example, FIG. 3 shows that Device_1 is a cellular phone, Device_2 is a smart phone, and Device_N is a notebook. The device type information can be manually entered by the user of the registered device of the OIS 108 can automatically obtain this information from the wireless device itself.

Entries 318 under the "Device Location" column 306 indicate a current location of the registered wireless device 110, 112. For example, the database record 300 shows that Device_1 is currently located in New York City, Device_2 is currently located in London, and Device_N is currently located in Los Angeles. FIG. 3 also shows that more detailed location information, such as GPS coordinates comprising latitude, longitude, and altitude information, can be used as well. The OIS 108 can automatically obtain the location information from the device's GPS system, current registered base station or WiFi hotspot, the device's user, or the like.

Entries 320 under the "Device Capabilities" column 308 indicate the information capturing capabilities of the associated device 110, 112. For example, FIG. 3 shows that Device_1 can capture audio, video, and GPS information; Device_2 can capture audio, video, GPS, and temperature information; and Device_N can capture audio, video, and seismic information. The user of the registered device can enter the device's capability information or the OIS 108 can automatically determine this information based on the type or model number of the device. However, in some instances a user may not want to make all capabilities of the device available to the OIS 108. Therefore, in one embodiment, the user of the registered device is able to selectively enable/disable which information capturing devices 114, 116 are made available to the OIS 108. In this embodiment, only the enabled information capturing devices are maintained in the database record 300. It should be noted that the capability information can also comprise additional details such as the quality of information being offered by the information capturing device 110, 112. For example, Device_1 may offer 192 kbs quality audio while Device_2 may offer 128 kbs quality audio.

Entries 322 under the "User Rating" column 310 indicate current user ratings associated with the registered device. For example, one or more embodiments enable users who receive information from one or more of the information providing devices 110, 112 to rate the information providing device. A user can rate the quality of the received information, the delivery time of the information, the value of the information, and the like. The OIS 108 maintains this rating information to either provide an average rating or individual ratings to users at requesting devices so they can make an informed decision when selecting a particular information providing device to provide requested information.

Entries 324 under the "Pricing Information" column 312 indicate the prices each information providing device 110, 112 charges for providing information. For example, FIG. 3 shows that Device_1 charges $0.50 for audio information and $0.75 for video information; Device_2 charges $0.30 for audio information, $0.60 for video information, $0.15 for temperature information; and Device_N charges $0.50 for audio information, $0.75 for video information; and $1.50 for seismic information. A user of the information capturing device 110, 112 enters this information when registering the device 110, 112 with the OIS 108 and can update this information at any time.

Returning now to FIG. 2 information requesters such as users at the user systems 104 interact with the OIS 108 to request a given information set associated with a given set of geographical locations. For example, a user utilizes the OIS interface 118 to send an information request 204 to the OIS 108. It should be noted that the information requesting device 104 can have an account with the OIS 108, but is not required to. The OIS 108, in one embodiment, manages the information request 204 through a request handling component 206. The request handling component 206 analyzes the request 204 to identify various search parameters included within the request 204.

The information request 204, in one embodiment, comprises the information type being requested and the location where the user wants to information to be collected from. For example, the user at the requesting device 104 can send an information request 204 to the OIS 108 that comprises a request for a video of Malibu beach along with temperature information from Malibu beach. The user can also include rating and information quality information along with the request as well.

Based on this information request 204 the request handling component 206 initiates a search of information associated with information providers 110, 112 in the database 202 to identify registered information providing devices 110, 112 that are able to provide the requested information. For example, the OIS 108 searches the database 202 to identify registered information providers 110, 112 that are currently located at Malibu beach or that are within a given proximity to the location and that can also provide video and temperature information.

Once the OIS 108 identifies these information providers 110, 112 the request handling component 0 sends a demand notification 510 to the identified devices that someone is requesting information. This notification includes, in one embodiment, at least the information type and location being requested by the requesting device 104. This notification, in one embodiment, is displayed to the user of the information providing device 110, 112 via the OIS interface 120, 122. However, a text message, email, instant message, etc. can also be sent that informs the user about the information request. The user of the information providing device 110, 112 then communicates with the OIS 108 via the OIS interface 120, 122 to indicate whether or not the user is interested in providing the requested information.

Figure 4:
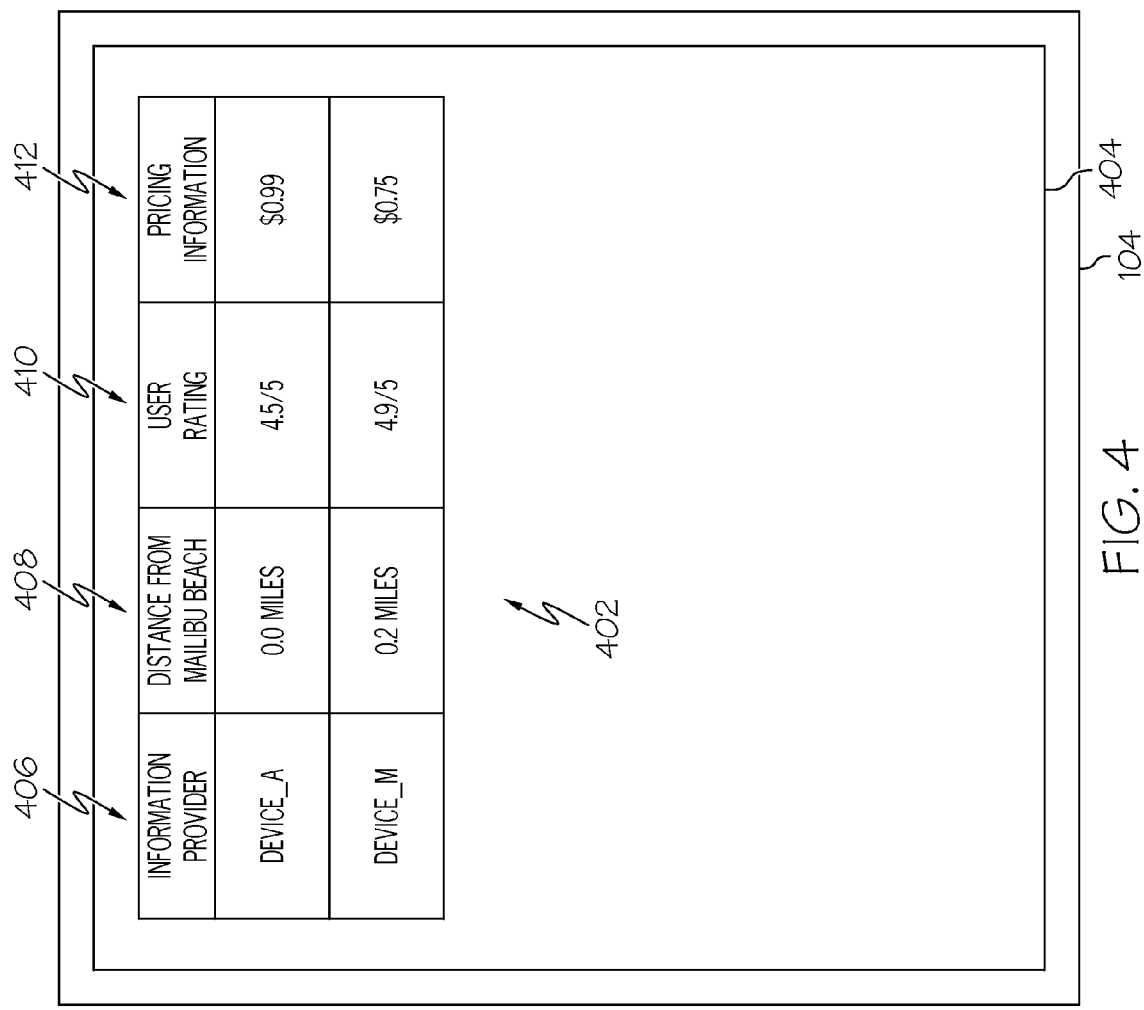
FIG. 4 illustrates one example of an information provider list according to one embodiment of the present invention.

Once the OIS 108 identifies the information providers 110, 112 that are interested in providing the requested information, the request handling component 206 sends a list, via the OIS interface 118 (or any other means of communication) to the information requesting device 104, of information provider 110, 112 that the user can select for the information request. For example, FIG. 4 shows that a list 402 of information providers has been displayed to the user on the display 404 of the user system 104. In one embodiment, the information 402 displayed to the user identifies the potential information providers 406, the distance 408 each of the potential providers are from the requested information location, a user rating 410 (if available) associated with each potential provider, and pricing information 412 associated with the information request. It should be noted that this information 406, 408, 410, 412 being displayed to the user is only one example and either less or more information can be displayed as well.

Figure 5:
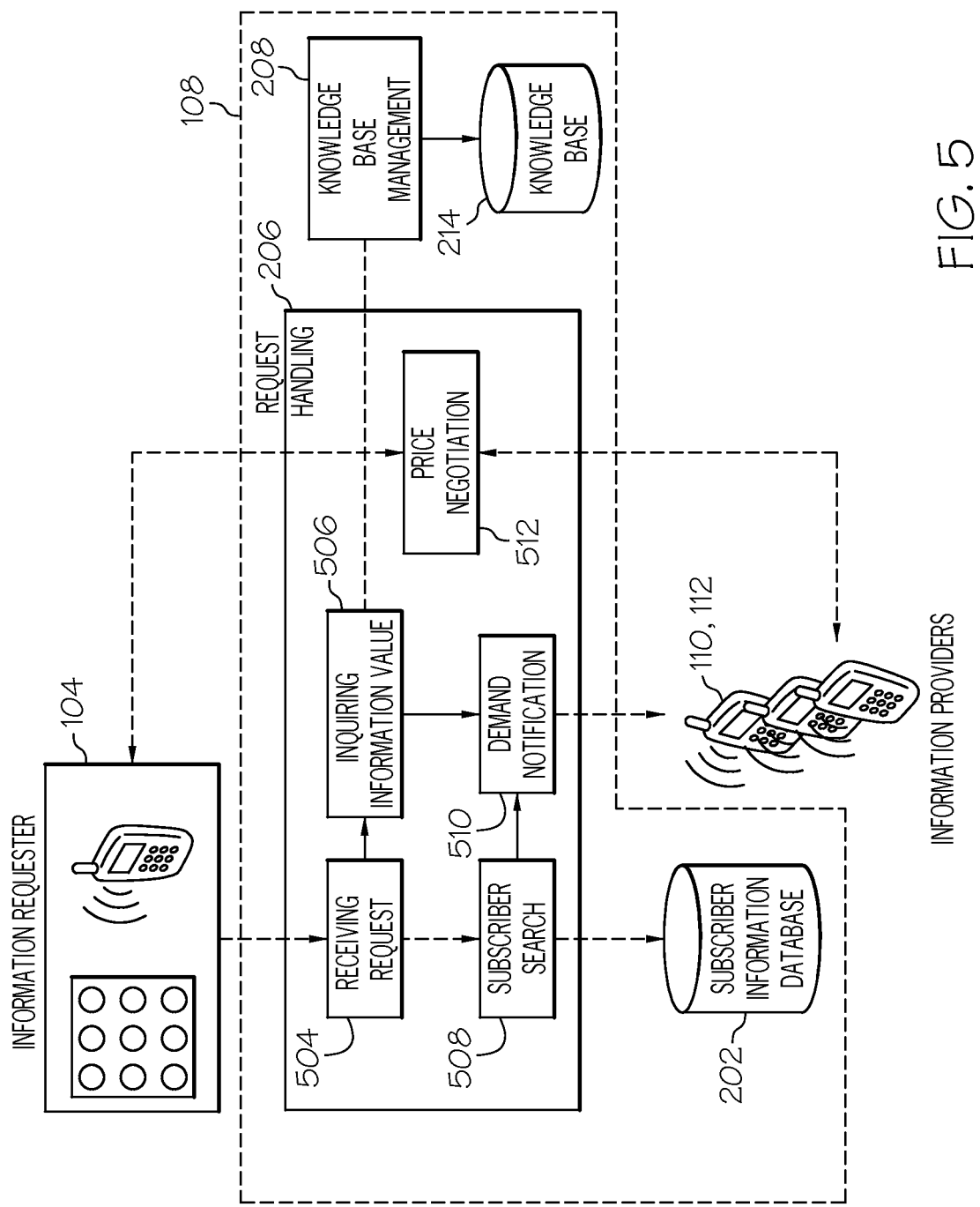
FIG. 5 is a block diagram illustrating a detailed view of a request handling component of an on-demand information system according to one embodiment of the present invention.

This information 406, 408, 410, 412 helps the user to determine which information provider to select to provide the requested information. The pricing information can either be based off of what information provider has entered into the OIS 108 for providing such services or the request handling component 206 can receive pricing information from other components of the OIS 108 (i.e., pricing information can be based on a suggested pricing value determined by the OIS 108). For example, a knowledge base management component 208 comprises a demand analysis and pricing component 210 and a value forecasting component 212 that are used to determining suggested prices for various information sets However, the demand analysis and pricing component can also reside within the request handling component 206 as shown in FIG. 5.

In one embodiment, the OIS 108, via a knowledge base management component 208, can monitor and analyze past transactions between information requestors and information providers to predict the value of future transactions that have been stored in a knowledge base 214. For example, the OIS 108 can suggest pricing information for video and temperature data associated with Malibu beach based on previous transactions for video and temperature in general, video and temperature data associated with beaches, video and temperature data associated specifically with Malibu beach, and the like.

In another embodiment, pricing information can also be suggested based on the quality of the information to be received (e.g., a high price for higher resolution video as compared to a lower price for lower resolution data) and/or the user rating associated with the information provider (e.g., a higher price for a higher user rating as compared to a lower price for a lower user rating). It should be noted that the OIS 108 can also use additional heuristics and algorithms to perform demand analysis and pricing and value forecasting operations.

Once the user receives the list 402 of potential information providers from the OIS 108, the user then selects the information provider(s) that he/she desires. In another embodiment, the user is able to negotiate the price with the potential information providers through the request handling component 206. If pricing information 412 is provided by the OIS 108 the user of the requesting device 104 and the user of the information providing device 110, 112 can use this price as an initial negotiating point. However, if pricing information 412 is not provided either the user of the requesting device 104 or the user of the information providing device 110, 112 can suggest an initial price. In the negotiating embodiment, the users of the requesting 104 and providing devices 110, 112 send pricing offers/counter offers through the OIS 108 until a price is agreed upon. It should be noted that the user of the requesting device 104 can also negotiate pricing information between multiple information provider 110, 112 and then select a provider based off of the negotiated price.

Once the user of the requesting device 104 selects an information provider 110, 112 and has negotiated a price (if applicable) the user sends his/her selection to the OIS 108 via the OIS interface 118. The OIS 108 then performs one or more payment handling operations 216. For example, if the user of the requesting device 104 has an account with the OIS 108 then the user's account is automatically debited. However, if the user does not have an account with the OIS 108 then the user is able to send payment information to the OIS 108 through the OIS interface 118. Once the user of the requesting device 104 has provided payment to the OIS 108 or once the OIS has debited the user's account, the OIS 108 credits the information provider's account with payment from the requesting device user.

After the information provider 110, 112 has captured the requested information such as video and temperature from Malibu beach request, the information providing device transmits this information to the OIS 108. The OIS 108 receives this information via a receiving/sending component 218 and stores the information in the knowledge base 214 (e.g., database). Once the OIS 108 receives this information it then transmits this information via the receiving/sending component 218. The requested information that satisfies the information request can be sent via the OIS 108 interface 118. However, in another embodiment, the OIS 108 can send the requested information via text/mms message, instant message, email, or the like. The OIS 108 can also inform the user of the requesting device 104 that the information is ready to be viewed at the OIS 108. The user of the requesting device 104 can then log into the OIS 108 and view the requested information. The user can then rate the information provider 110, 112 that sent the requested information based on the quality of the information, the price value of the information, the delivery time, and the like. The OIS 108 receives this rating information via a rating component 220 then updates the rating associated with the information provider 110, 112 accordingly. It should be noted that even though FIG. 2 shows the paths for the information request 204 and the providing rating 220 being separate, a single path can comprise both the information request 204 and provider rating 220 as well. For example, the information request 204 can comprise a request for a provider with a specific rating.

In another embodiment, users are not required to only request current or real-time information. For example, the OIS 108 can maintain information captured by the information capturing devices in the knowledge base 214. This information can then be rendered, via a rendering component 222, on the user's device either through one or more client applications or browsers 224. Therefore, users at requesting devices 104 can also purchase information that has been captured in the past. In one embodiment, if a user is interested in purchasing information captured in the past, the OIS 108 can present a similar list to the user as discussed above with respect to FIG. 4. The OIS 108 can also include information regarding the date and time of when the information was captured so that the user can select the information based on when the data was captured in the past. It should be noted that a user can also request information that will happen in the future such as an eclipse, bird migration, etc.

As can be seen from the above discussion, various embodiments of the present invention utilizes wireless devices around the globe to collect audio, visual, and other types of sensor information on demand from a selected geographic location. The requestor for the information sends a request message to the OIS. The request message can comprise location information and type of information requested. The system finds a registered information providing device that near or within a given distance to the specified location and manages pricing negotiations between the requester and information provider. Once the agreement is reached, the information provider goes to the exact location by using GPS information to collect the information and send the information by using a mobile device such as a cell phone to the OIS. The OIS collects the information and forwards it to the requestor. The OIS handles the payment transaction for the information between the parties. The OIS also analyzes the demand and collected information to forecast the value of certain type of information in different geographic locations. The information collected and archived can also be used for commercial purposes as well.

Request Handling

FIG. 5 is a block diagram illustrating a more detailed view of the request handling component 206 of the OIS 108. In particular, FIG. 5 shows that an information requesting device's requests are received and processed by a receiving request component 504. The request message comprises the type and location of the information requested. The market value of the requested information is inquired from the knowledge base 214 by an inquiring information value component 506. Based on the location of the information requested the potential information providers are searched in the subscriber information database 202 by a subscriber search component 508. Information about the subscribers, potential information providers, is maintained in the database 202. Once the list of information providers 110, 112 that are in the vicinity of the location for which the information is requested are retrieved from the database 202, notifications are broadcast by using a demand notification component 510. The notification messages comprise the type and the value of information requested. The information providers 110, 112 that can fulfill the request can negotiate the price with the information rrequestor 104 through a price negotiation component 512.

Operational Flow Diagrams

Figure 6:
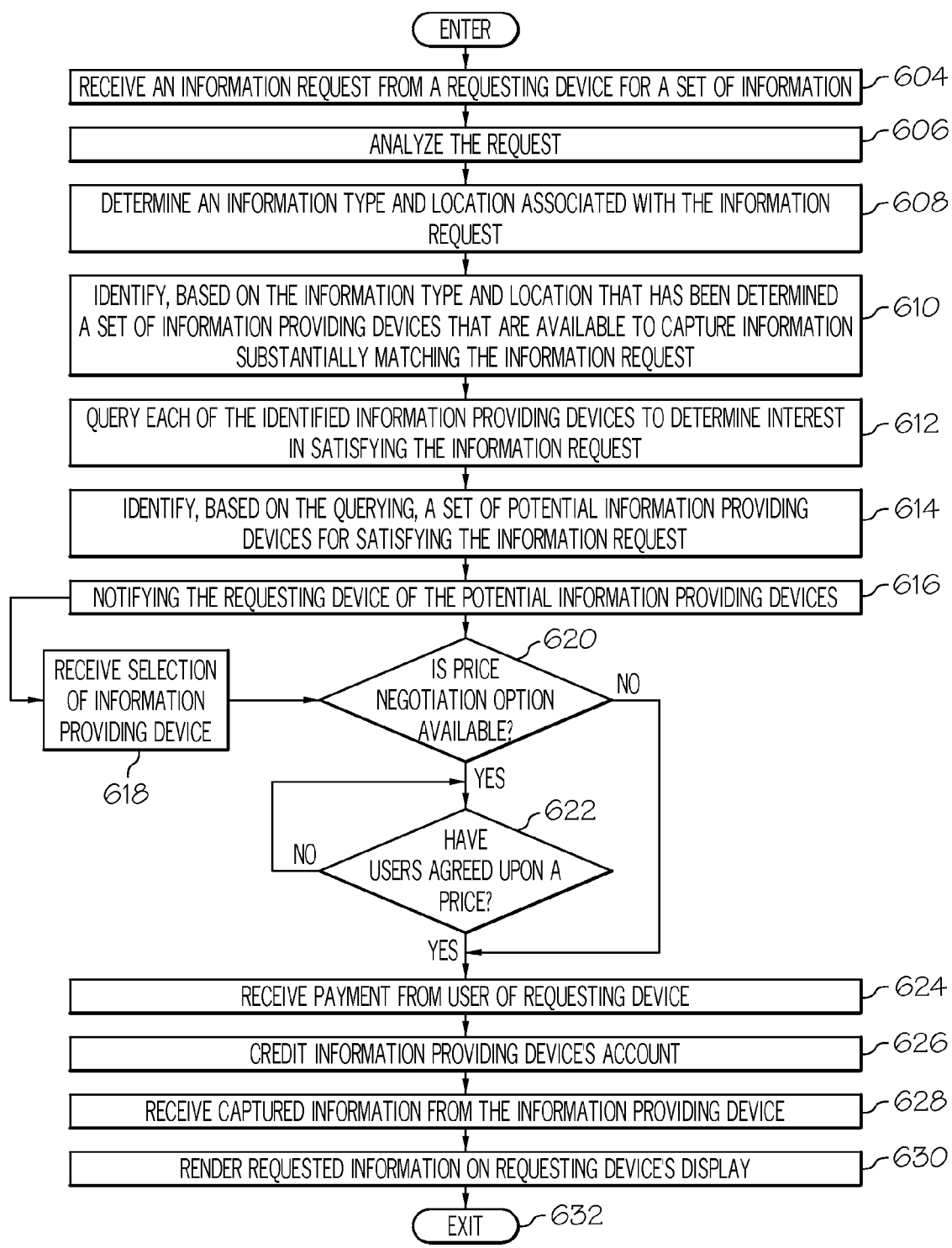
FIG. 6 is an operational flow diagram illustrating one process for providing on-demand information captured by a wireless device to a requesting device according to one embodiment of the present invention.

FIG. 6 is an operational flow diagram illustrating one example of a process for providing and managing on-demand information captured from a wireless device to a device that has requested the information. The operational flow diagram of FIG. 6 begins at step 602 and flows directly to step 604. The OIS 108, at step 604, receives an information request from a requesting device 104 for a set of information to be captured by one or more wireless devices (information providers) 110, 112. The OIS 108, at step 606, analyzes the request. The OIS 108, at step 608, determines an information type and location associated with the information request based on the analyzing. The OIS 108, at step 610, identifies, based on the information type and location that has been determined, a set of information providers 110, 112 that are able to capture information that substantially matches the information request.

The OIS 108, at step 612, queries each of these identified information providers 110, 112 to determine if the users of these devices are interested in satisfying the information request. The OIS 108, at step 614, identifies a set of available/interested information providers 110, 112 based on the responses received from the query. The OIS 108, at step 616, notifies the requesting device 104, of the set of available information providing devices 110, 112. The OIS 108, at step 618, receives the selection of an information provider(s) 110, 112 from the requesting device 104.

The OIS 108, at step 620, determines if there is a price negotiation option available for this transaction. If the result of this determination is negative, the control flows to step 624. If the result of this determination is positive, the OIS 108, at step 622, determines if the users of the requesting and information providing devices have agreed upon a price. If the result of this determination is negative, the OIS 108 waits until the parties have agreed upon a price. If the result of this determination is positive, the OIS 108, at step 624, receives payment information from requesting device 104. The OIS 108, at step 626, credits the information providing device's account. The OIS 108, at step 628, then receives then requested information from the information providers 110, 112. The OIS 108, at step 630, renders the requested information on the requesting device's display. The control flow then exits at step 632.

Figure 7:
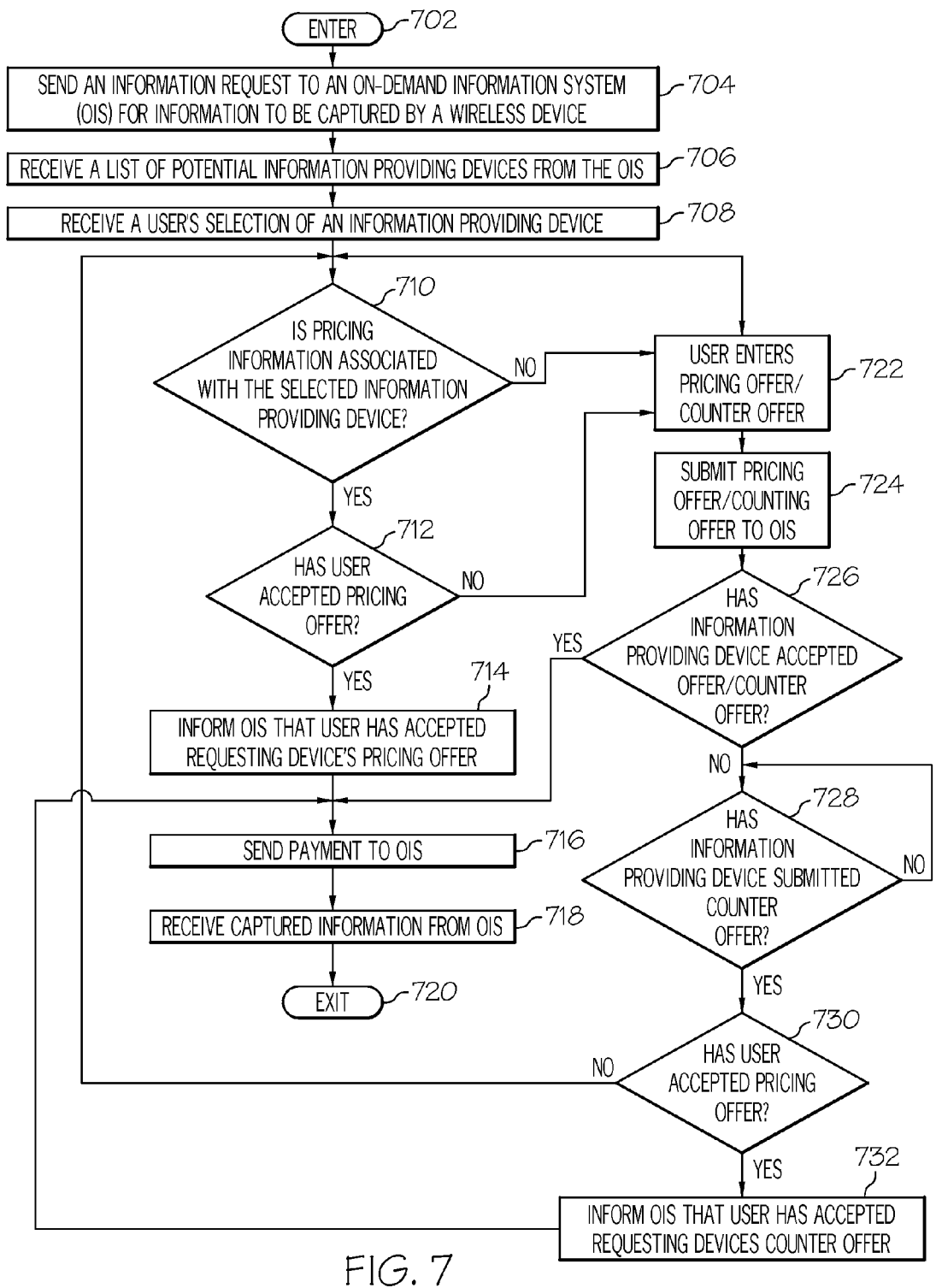
FIG. 7 is an operational flow diagram illustrating one process of requesting and receiving information from a wireless device according to one embodiment of the present invention.

FIG. 7 is an operational flow diagram illustrating one example of a process for requesting and receiving on-demand information captured from a wireless device. The operational flow diagram of FIG. 7 begins at step 702 and flows directly to step 704. The requesting device 104, at step 704, sends an information request to the OIS 108 for a given set of information to be captured at a given location by a wireless device (information provider) 110, 112. The requesting device 104, at step 706, receives a list of potential information providers 110, 112 from the OIS 108. The requesting device 104, at step 708, receives a user's selection of an information providing device 110, 12 from the list. The requesting device 104, at step 710, determines if pricing information for the transaction has been provided. If the result of this determination is positive, the requesting device 104, at step 712, determines if the user has accepted the pricing offer for the transaction. If the result of this determination is negative, the control flows to step 722. If the result of this determination is positive, the requesting device 104, at step 714, informs the OIS 108 that the user has accepted the pricing offer.

The requesting device 104, at step 716, sends payment information to the OIS 108. The requesting device 104, at step 718, receives the requested information that has been captured by the information providers 110, 112 from the OIS 108. The control flow then exits at step 720. Returning back to step 710, if the determination is negative, the requesting device 104, at step 722, receives a pricing offer from the user. The requesting device 104, at step 724, submits the pricing offer to the OIS 108.

The requesting device 104, at step 726, determines if the information provider 110 has accepted the requesting device's offer. If the result of this determination is positive, the control flows to step 716. If the result of this determination is negative, the requesting device 104, at step 728, determines if the information provider 110 has provided a counter offer. If the result of this determination is negative, the requesting device 104 continues monitoring for a counter offer from the information provider 110. If the result of this determination is positive, the requesting device 104, at step 730, determines if the user of the requesting device 104 has accepted the counter offer. If the result of this determination is positive, the requesting device 104, at step 732, informs the OIS 108 that the user has accepted the counter offer and the control flows to step 716. If the result of this determination is negative, the control flow back to step 722 where the requesting device 104 receives a counter offer from the user.

Figure 8:
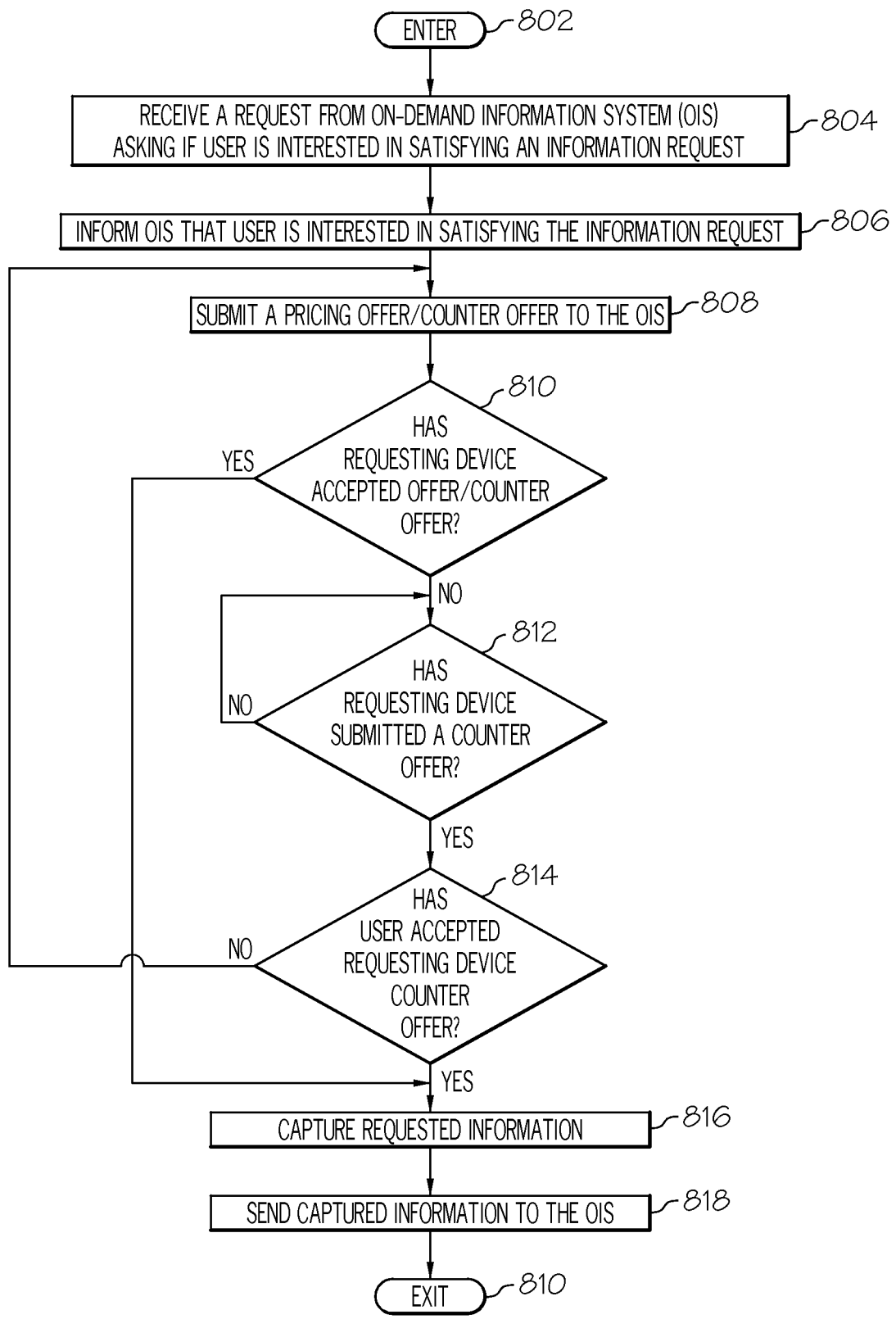
FIG. 8 is an operational flow diagram illustrating one process of receiving a request at a wireless device to capture and provide information from a given location according to one embodiment of the present invention.

FIG. 8 is an operational flow diagram illustrating one example of a process for providing on-demand information requested by device. The operational flow diagram of FIG. 8 begins at step 802 and flows directly to step 804. The information providing device 110, at step 804, receives a request from the OIS 108, to determine if the information providing device 110 is available to satisfy an information request. The information providing device 110, at step 806, informs the OIS 108 that it is available. The information providing device 110, at step 808, submits a pricing offer to the OIS 108 for satisfying the information request.

The information providing device 110, at step 810, determines if the requesting device has accepted the pricing offer (via the OIS 108). If the result of this determination is positive, the information providing device 110, at step 816, captures the requested information. The information providing device 110, at step 818, sends the captured information to the OIS 108. The control flow then exits at step 820. If the result of the determination at step 810 is negative, the information providing device 110, at step 812 determines if the requesting device has submitted a counter offer. If the result of this determination is negative, the information providing device 110 continues to monitor for a counter offer from the requesting device. If this determination is positive, the information providing device 110, at step 814, determines if the user of the information providing device 110 has accepted the counter offer. If the result of this determination is positive, the control flows to step 816. If the result of this determination is negative, the control flows back to step 808 where the information providing device 110 submits a counter offer to the OIS 108.

Information Processing System

Figure 9:
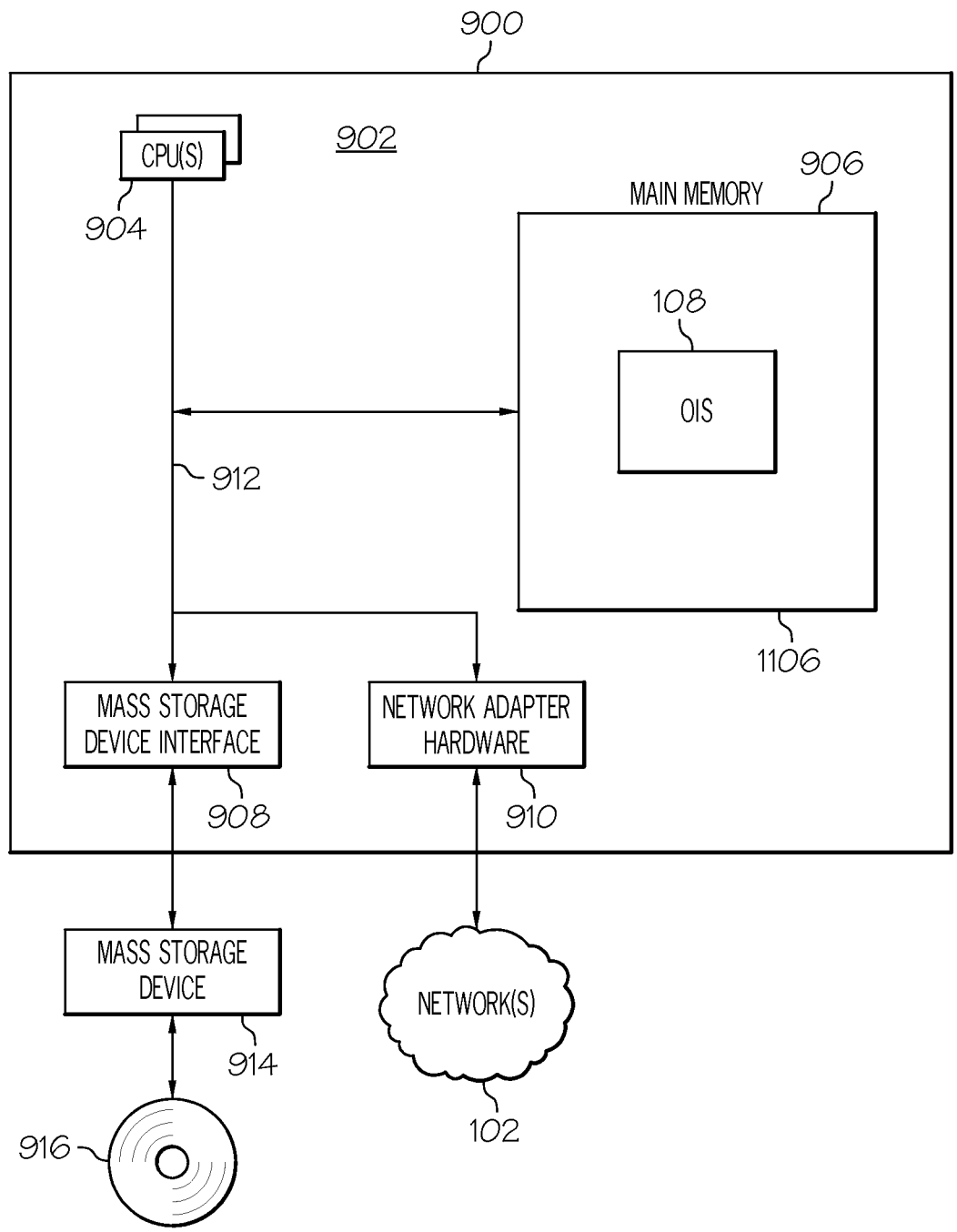
FIG. 9 is a block diagram illustrating a detailed view of an information processing system according to one embodiment of the present invention.

FIG. 9 is a block diagram illustrating a more detailed view of an information processing system 900 that can be utilized in the operating environment 100 discussed above with respect to FIG. 1. For example, the information processing system 900 can be utilized as the server 106 or the user system 104. The information processing system 900 is based upon a suitably configured processing system adapted to implement one or more embodiments of the present invention. Similarly, any suitably configured processing system can be used as the information processing system 900 by embodiments of the present invention.

The information processing system 900 includes a computer 902. The computer 902 has a processor(s) 904 that is connected to a main memory 906, mass storage interface 908, and network adapter hardware 910. A system bus 912 interconnects these system components. The main memory 906, in one embodiment, comprises the OIS 108 (or the OIS interface 118) discussed above.

Although illustrated as concurrently resident in the main memory 906, it is clear that respective components of the main memory 906 are not required to be completely resident in the main memory 906 at all times or even at the same time. In one embodiment, the information processing system 900 utilizes conventional virtual addressing mechanisms to allow programs to behave as if they have access to a large, single storage entity, referred to herein as a computer system memory, instead of access to multiple, smaller storage entities such as the main memory 906 and data storage device 916. Note that the term "computer system memory" is used herein to generically refer to the entire virtual memory of the information processing system 900.

The mass storage interface 908 is used to connect mass storage devices, such as mass storage device 914, to the information processing system 900. One specific type of data storage device is an optical drive such as a CD/DVD drive, which may be used to store data to and read data from a computer readable medium or storage product such as (but not limited to) a CD/DVD 916. Another type of data storage device is a data storage device configured to support, for example, NTFS type file system operations.

Although only one CPU 904 is illustrated for computer 902, computer systems with multiple CPUs can be used equally effectively. Embodiments of the present invention further incorporate interfaces that each includes separate, fully programmed microprocessors that are used to off-load processing from the CPU 904. An operating system (not shown) included in the main memory is a suitable multitasking operating system such as the Linux, UNIX, Windows XP, and Windows Server operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 900. The network adapter hardware 910 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 916, CD ROM, or other form of recordable media, or via any type of electronic transmission mechanism.

Wireless Device

Figure 10:
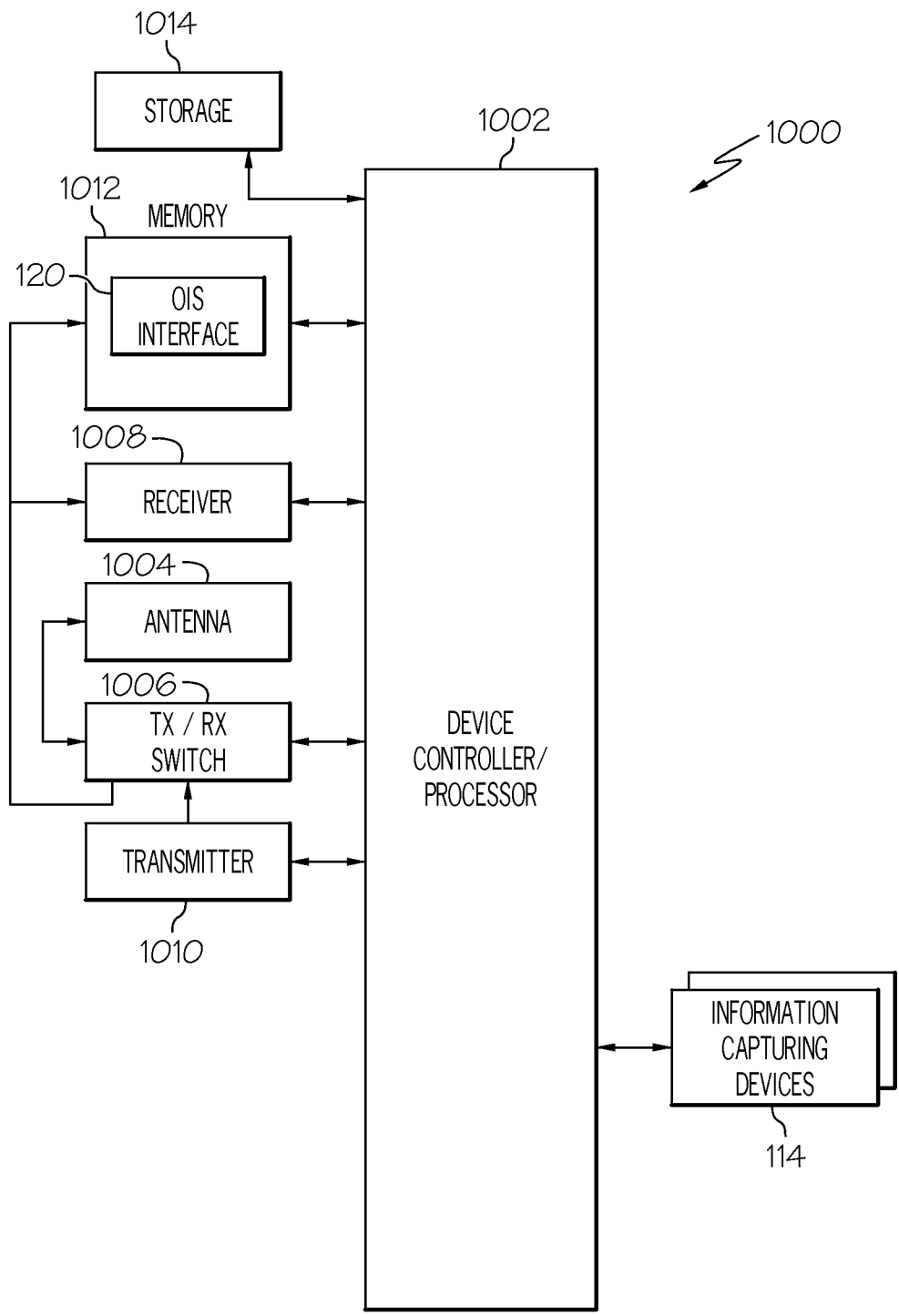
FIG. 10 is a block diagram illustrating a detailed view of a wireless device according to one embodiment of the present invention.

FIG. 10 is a block diagram illustrating a detailed view of a wireless device 1000 according to one embodiment of the present invention that can be utilized in the operating environment 100 discussed above with respect to FIG. 1. For example, the wireless device 1000 can be utilized as the information providing devices 110, 112 or the user system 104. It is assumed that the reader is familiar with wireless communication devices. To simplify the present description, only that portion of a wireless communication device that is relevant to one or more embodiments of present invention is discussed. The wireless device 1000 operates under the control of a device controller/processor 1002, that controls the sending and receiving of wireless communication signals. In receive mode, the device controller 1002 electrically couples an antenna 1004 through a transmit/receive switch 1006 to a receiver 1008. The receiver 1008 decodes the received signals and provides those decoded signals to the device controller 1002.

In transmit mode, the device controller 1002 electrically couples the antenna 1004, through the transmit/receive switch 1006, to a transmitter 1010. It should be noted that in one embodiment, the receiver 1008 and the transmitter 1010 are a dual mode receiver and a dual mode transmitter for receiving/transmitting over various access networks providing different air interface types. In another embodiment a separate receiver and transmitter is used for each of type of air interface. A memory 1012 includes, among other things, the OIS interface 120, 122, which has been discussed above. The wireless device 1000, also includes non-volatile storage memory 1014 for storing, for example, an application waiting to be executed (not shown) on the wireless device 1000. The wireless device 1000 also includes one or more information capturing devices 114, 116 discussed above.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method, executing on an information processing system, for providing on-demand information captured from wireless devices, the method comprising:

receiving an information request from an electronic device, wherein the information request comprises a request for a set of information of at least one information type associated with a geographical location to be captured from the geographical location, wherein the set of information is external to the electronic device;

analyzing, based on receiving the information request, information capturing capabilities of each wireless communication device in a plurality of wireless communication devices;

identifying, based on analyzing the information capturing capabilities of each wireless communication device, at least one wireless communication device from the plurality of wireless communication devices that is available to satisfy the information request by capturing the set of information external to the at least one wireless communication device from the geographical location, wherein the at least one wireless communication device is identified independent from a location of the electronic device;

sending, based on the identifying, a demand request to the at least one wireless communication device, the demand request notifying the at least one wireless communication device that the electronic device is requesting the at least one wireless communication device to capture the set of information from the geographical location;

receiving, from the at least one wireless communication device based on the sending, the set of information captured external to the at least one wireless communication device at a given geographical location that satisfies the information request, and wherein the set of information is captured by the at least one wireless communication device only after receiving the demand request; and sending the set of information that has been received to the electronic device.

2. The method of claim 1, wherein the identifying further comprises:

determining, based on the analyzing, that the at least one wireless communication device comprises a set of information capturing devices that capture information of a type associated with the information request.

3. The method of claim 1, wherein the sending is based on:

notifying the electronic device of the at least one wireless communication device that has been identified;

notifying the electronic device of a suggested price for satisfying the request determined by the information processing system; and receiving a selection from the wireless communication device of the at least one wireless communication device.

4. The method of claim 3, wherein the information request is sent to the at least one wireless communication device based on receiving the selection from the electronic device.

5. The method of claim 3, wherein the notifying further comprises:

notifying the electronic device of a price for satisfying the request as set by the at least one wireless communication device.

6. The method of claim 3, wherein the wireless communication devices is anyone of:

a cordless phone;
a two-way radio;
a cellular telephone;
a mobile phone;
a smartphone;
a two-way pager;
a wireless messaging device;
a laptop/computer;
automotive gateway; and
a residential gateway.

7. The method of claim 1, further comprising:

notifying the electronic device of the at least one wireless communication device that has been identified; and receiving, from one of the electronic device and the at least one wireless communication device, a transaction price associated with the at least one wireless communication device satisfying the information request.

8. The method of claim 7, further comprising:

sending the one of the electronic device and the at least one wireless communication device the transaction price that has been received;

determining that the one of the electronic device and the at least one wireless communication device has rejected the transaction price;

receiving at least one new transaction price from the one of the electronic device and the at least one wireless communication device that has rejected the transaction price;

determining that the one of the electronic device and the at least one wireless communication device that rejected the transaction price accepted the at least one new transaction price; and instructing, based on the determining, the at least one wireless communication device to satisfy the information request.

9. The method of claim 7, further comprising:

sending the one of the electronic device and the at least one wireless communication device the transaction price that has been received;

determining that the one of the electronic device and the at least one wireless communication device has accepted the transaction price; and instructing, based on the determining, the at least one wireless communication device to satisfy the information request.

10. An information processing system for providing on-demand information captured from wireless devices, the information system comprising:

a memory;

a processor communicatively coupled to the memory; and a request handler communicatively coupled to the memory and the processor, wherein the request handler is configured to perform a method comprising;

receiving an information request from an electronic device, wherein the information request comprises a request for a set of information of at least one information type associated with a geographical location to be captured from the geographical location, wherein the set of information is external to the electronic device;

analyzing, based on receiving the information request, information capturing capabilities of each wireless communication device in a plurality of wireless communication devices;

identifying, based on analyzing information capturing capabilities of each wireless communication device, at least one wireless communication device from the plurality of wireless communication devices that is available to satisfy the information request by capturing the set of information external to the at least one wireless communication device from the geographical location, wherein the at least one wireless communication device is identified independent from a location of the electronic device;

sending, based on the identifying, a demand request to the at least one wireless communication device, the demand request notifying the at least one wireless communication device that the electronic device is requesting the at least one wireless communication device to capture the set of information from the geographical location;

receiving, from the at least one wireless communication device based on the sending, the set of information captured from an environment external to the at least one wireless communication device and at the given geographical location that satisfies the information request, and wherein the set of information is captured by the at least one wireless communication device only after receiving the demand request; and sending the set of information that has been received to the electronic device.

11. The information processing system of claim 10, wherein the identifying further comprises:

determining, based on the analyzing, that the at least one wireless communication device comprises a set of information capturing devices that capture information of a type associated with the information request.

12. The information processing system of claim 10, wherein the sending is based on:
  notifying the electronic device of the at least one wireless communication device that has been identified; and
  receiving a selection from the wireless communication device of the at least one wireless communication device.

13. The information processing system of claim 10, wherein the method further comprises:
  notifying the electronic device of the at least one wireless communication device that has been identified; and
  receiving, from one of the electronic device and the at least one wireless communication device, a transaction price associated with the at least one wireless communication device satisfying the information request.

14. The information processing system of claim 13, wherein the method further comprises:
  sending the one of the electronic device and the at least one wireless communication device the transaction price that has been received;
  determining that the one of the electronic device and the at least one wireless communication device has rejected the transaction price;
  receiving at least one new transaction price from the one of the electronic device and the at least one wireless communication device that has rejected the transaction price;
  determining that the one of the electronic device and the at least one wireless communication device that rejected the transaction price accepted the at least one new transaction price; and
  instructing, based on the determining, the at least one wireless communication device to satisfy the information request.

15. The information processing system of claim 13, wherein the method further comprises:
  sending the one of the electronic device and the at least one wireless communication device the transaction price that has been received;
  determining that the one of the electronic device and the at least one wireless communication device has accepted the transaction price; and
  instructing, based on the determining, the at least one wireless communication device to satisfy the information request.

16. A computer program product for providing on-demand information captured from wireless devices, the computer program product comprising:
  a non-transitory storage medium readable by a processing circuit and storing instructions for execution by the processing circuit for performing a method comprising:
    receiving an information request from an electronic device, wherein the information request comprises a request for a set of information of at least one information type associated with a geographical location to be captured from the geographical location, wherein the set of information is external to the electronic device;
    analyzing, based on receiving the information request, a set of information capturing capabilities of each wireless communication device in a plurality of wireless communication devices;
    identifying, based on analyzing the information capturing capabilities of each wireless communication device, at least one wireless communication device from the plurality of wireless communication devices that is available to satisfy the information request by capturing the set of information external to the at least one wireless communication device from the geographical location, wherein the at least one wireless communication device is identified independent from a location of the electronic device;
    sending, based on the identifying, a demand information request to the at least one wireless communication device, the demand request notifying the at least one wireless communication device that the electronic device is requesting the at least one wireless communication device to capture the set of information from the geographical location;
    receiving, from the at least one wireless communication device, the set of information captured external to the at least one wireless communication device at a given geographical location that satisfies the information request, and wherein the set of information is captured by the at least one wireless communication device only after receiving the demand request; and
    sending the set of information that has been received to the electronic device.

17. The computer program product of claim 16, wherein the identifying further comprises:
  determining, based on the analyzing that the at least one wireless communication device comprises a set of information capturing devices that capture information of a type associated with the information request.

18. The computer program product of claim 16, wherein the sending is based on:
  notifying the electronic device of the at least one wireless communication device that has been identified; and
  receiving a selection from the wireless communication device of the at least one wireless communication device.

19. The computer program product of claim 16, wherein the method further comprises:
  notifying the electronic device of the at least one wireless communication device that has been identified; and
  receiving, from one of the electronic device and the at least one wireless communication device, a transaction price associated with the at least one wireless communication device satisfying the information request.

20. The computer program product of claim 19, wherein the method further comprises:
  sending the one of the electronic device and the at least one wireless communication device the transaction price that has been received;
  determining that the one of the electronic device and the at least one wireless communication device has rejected the transaction price;
  receiving at least one new transaction price from the one of the electronic device and the at least one wireless communication device that has rejected the transaction price;
  determining that the one of the electronic device and the at least one wireless communication device that rejected the transaction price accepted the at least one new transaction price; and
  instructing, based on the determining, the at least one wireless communication device to satisfy the information request.

* * * * *